United States Patent
Nadella (10) Patent No.: US 9,914,247 B2
(45) Date of Patent: Mar. 13, 2018

(54) METHOD FOR INFUSING A GAS INTO A THERMOPLASTIC MATERIAL, AND RELATED SYSTEMS

(71) Applicant: Dart Container Corporation, Mason, MI (US)

(72) Inventor: Krishna Nadella, Redmond, WA (US)

(73) Assignee: Dart Container Corporation, Mason, MI (US)

( * ) Notice: Subject to any disclaimer, the term of this patent is extended or adjusted under 35 U.S.C. 154(b) by 640 days.

(21) Appl. No.: 14/381,927

(22) PCT Filed: Feb. 28, 2013

(86) PCT No.: PCT/US2013/028282
§ 371 (c)(1),
(2) Date: Aug. 28, 2014

(87) PCT Pub. No.: WO2013/130780
PCT Pub. Date: Sep. 6, 2013

(65) Prior Publication Data
US 2015/0042005 A1 Feb. 12, 2015

Related U.S. Application Data

(60) Provisional application No. 61/605,004, filed on Feb. 29, 2012, provisional application No. 61/752,220, filed on Jan. 14, 2013.

(51) Int. Cl.
*B29C 44/20* (2006.01)
*B29C 44/34* (2006.01)
(Continued)

(52) U.S. Cl.
CPC .......... *B29C 44/20* (2013.01); *B29C 44/3403* (2013.01); *B29C 44/3442* (2013.01);
(Continued)

(58) Field of Classification Search
CPC . B29C 44/20; B29C 44/3403; B29C 44/3442; B29C 44/3453; B29C 44/587
(Continued)

(56) References Cited

U.S. PATENT DOCUMENTS 1,948,568 A 2/1934 Faber
2,224,997 A 12/1940 Weisse
(Continued)

FOREIGN PATENT DOCUMENTS

CA 2012985 A1 9/1991
EP 0329490 A2 8/1989
(Continued)

OTHER PUBLICATIONS

Wang, "Solvent-free Fabrication of Porous Polymer for Tissue Engineering Applications," University of Washington, Dept. of Mechanical Engineering (dissertation), 2007.
Kumar, "A model for the unfoamed skin on microcellular foams", 1994, Polymer Engineering & Science 34(3) pp. 169-173.
Holl, "A steady-state mass balance model of the polycarbonate CO2 System", 2001, Journal of Polymer Science Part B, vol. 39 p. 868-880.
Kumar, "A process for making thermoplastic parts", 1990, 30(20), Polymer Engineering and Science, Oct. 1990, p. 1323-1329.
Kumar, "Semi-continuous production of solid state PET foams," Society of Plastics Engineers Conference Proceedings, 1995, vol. II, pp. 2189-2192.
Zhang, "An in situ study of plasticization of polymers by high-pressure gases", 1998, Journal of Polymer Science Part A: polymer chemistry 36(6) p. 977-982.
(Continued)

*Primary Examiner* — Christina Johnson
*Assistant Examiner* — Xue Liu
(74) *Attorney, Agent, or Firm* — McGarry Bair PC (57) ABSTRACT

A method for infusing gas into a thermoplastic material includes positioning a sheet of a thermoplastic material into a vertical or substantially vertical position; positioning a sheet of a gas-permeable material into a vertical or substantially vertical position; and winding together the positioned sheet of thermoplastic material sheet and the positioned sheet of gas-permeable material to form a roll of the thermoplastic material interleaved with the gas-permeable material, the interleaved roll having a longitudinal axis oriented in a vertical or substantially vertical position. The method also includes exposing the interleaved roll to an atmosphere of a gas pressurized to infuse the thermoplastic material with the gas, while the longitudinal axis of the interleaved roll is oriented in a vertical or substantially vertical position; and
(Continued)

then unwinding the gas-infused interleaved roll, while the longitudinal axis of the interleaved roll remains in a vertical or substantially vertical position.

17 Claims, 5 Drawing Sheets

(51) Int. Cl.
| | |
|---|---|
| *C08J 9/33* | (2006.01) |
| *C08J 9/12* | (2006.01) |
| *B29C 44/58* | (2006.01) |
| B29K 101/12 | (2006.01) |
| B29K 105/00 | (2006.01) |
| B29L 7/00 | (2006.01) |

(52) U.S. Cl.
CPC ........ *B29C 44/3453* (2013.01); *B29C 44/587* (2013.01); *C08J 9/122* (2013.01); *C08J 9/33* (2013.01); B29K 2101/12 (2013.01); B29K 2105/256 (2013.01); B29K 2913/00 (2013.01); B29K 2995/0065 (2013.01); B29L 2007/00 (2013.01); C08J 2201/032 (2013.01); C08J 2203/06 (2013.01); C08J 2367/02 (2013.01)

(58) Field of Classification Search
USPC .......................................................... 264/20
See application file for complete search history.

(56) References Cited

U.S. PATENT DOCUMENTS

| | | | |
|---|---|---|---|
| 2,317,448 A | 4/1943 | Dreyfus | |
| 2,629,312 A | 2/1953 | Davis | |
| 2,755,029 A | 7/1956 | Speed et al. | |
| 2,917,217 A | 12/1959 | Sisson | |
| 3,217,845 A | 11/1965 | Reynolds et al. | |
| 3,244,537 A | 4/1966 | Cease | |
| 3,260,781 A | 7/1966 | Lux | |
| 3,364,519 A | 1/1968 | Pitsch | |
| 3,557,265 A | 1/1971 | Chrisholm | |
| 3,610,000 A | 10/1971 | Lopata | |
| 3,617,311 A | 11/1971 | Beltle | |
| 3,744,402 A | 7/1973 | Piegza | |
| 3,803,332 A | 4/1974 | Sieferth | |
| 3,836,624 A | 9/1974 | Ferris | |
| 3,845,915 A | 11/1974 | Schmidt et al. | |
| 3,846,526 A | 11/1974 | Wade | |
| 3,883,625 A | 5/1975 | Thomas | |
| 3,895,911 A | 7/1975 | Prins | |
| 3,923,556 A | 12/1975 | Iszcukiewicz | |
| 3,937,777 A | 2/1976 | Wienand | |
| 3,955,482 A | 5/1976 | Moen | |
| 3,978,260 A | 8/1976 | Dobbins et al. | |
| 4,003,184 A | 1/1977 | Shiu | |
| 4,003,302 A | 1/1977 | Mencacci | |
| 4,059,660 A | 11/1977 | Roth | |
| 4,074,941 A | 2/1978 | Jablonski | |
| 4,188,432 A | 2/1980 | Holden | |
| 4,284,596 A | 8/1981 | Inokuchi | |
| 4,304,747 A | 12/1981 | Lake | |
| 4,335,606 A | 6/1982 | Michalak | |
| 4,386,188 A | 5/1983 | Grancio | |
| 4,424,287 A | 1/1984 | Johnson | |
| 4,456,571 A | 6/1984 | Johnson | |
| 4,473,665 A | 9/1984 | Martini-Vvendensky | |
| D277,632 S | 2/1985 | Staufenberg | |
| 4,511,520 A | 4/1985 | Bowen | |
| 4,552,789 A | 11/1985 | Winchell | |
| 4,608,009 A | 8/1986 | Whiteside | |
| 4,616,991 A | 10/1986 | Bach et al. | |
| 4,632,862 A | 12/1986 | Mullen et al. | |
| 4,673,695 A | 6/1987 | Aubert | |
| 4,693,856 A | 9/1987 | Rubens | |
| 4,756,091 A | 7/1988 | Van Denend | |
| 4,761,256 A * | 8/1988 | Hardenbrook | ........ B29C 44/348 264/40.7 |
| 4,848,543 A | 7/1989 | Doboze | |
| 4,886,563 A | 12/1989 | Bennett | |
| 4,894,248 A | 1/1990 | Pappas | |
| 4,911,869 A | 3/1990 | Meyer | |
| 4,981,631 A | 1/1991 | Cheung | |
| 5,047,280 A | 9/1991 | Bach | |
| 5,128,202 A | 7/1992 | Subramian | |
| 5,145,107 A | 9/1992 | Silver | |
| 5,158,986 A | 10/1992 | Cha | |
| 5,172,443 A | 12/1992 | Christ | |
| 5,182,307 A | 1/1993 | Kumar | |
| 5,207,008 A | 5/1993 | Wimburger | |
| 5,217,660 A | 6/1993 | Howard | |
| 5,223,545 A | 6/1993 | Kumar | |
| 5,275,544 A * | 1/1994 | Marlowe | ................ B29C 44/34 249/113 |
| 5,303,484 A | 4/1994 | Hagen | |
| 5,334,356 A | 8/1994 | Baldwin | |
| 5,362,436 A | 11/1994 | Wagner | |
| 5,364,696 A | 11/1994 | Wagner | |
| 5,369,135 A | 11/1994 | Campbell | |
| 5,437,846 A | 8/1995 | Roumagnac | |
| 5,484,640 A | 1/1996 | Mullen et al. | |
| 5,589,243 A | 12/1996 | Day | |
| 5,640,784 A | 6/1997 | Rochelau | |
| 5,684,055 A | 11/1997 | Kumar | |
| 5,723,510 A | 3/1998 | Kabumoto | |
| 5,747,085 A | 5/1998 | Veltman | |
| 5,783,610 A | 7/1998 | Fukushima | |
| 5,792,295 A | 8/1998 | Huebmer | |
| 5,835,657 A | 11/1998 | Suarez | |
| 5,844,731 A | 12/1998 | Kabumoto | |
| 5,846,582 A | 12/1998 | Mayfield | |
| 5,867,920 A | 2/1999 | Rogne | |
| 5,894,046 A | 4/1999 | Kim | |
| 5,904,946 A | 5/1999 | Kemp | |
| 5,955,014 A | 9/1999 | Raukola | |
| 6,012,583 A | 1/2000 | Ramirez | |
| 6,025,049 A | 2/2000 | Ouelette et al. | |
| 6,074,678 A | 6/2000 | Blackwelder | |
| 6,083,580 A | 7/2000 | Finestone et al. | |
| 6,102,313 A | 8/2000 | Salzsauler | |
| 6,235,380 B1 | 5/2001 | Tupil | |
| 6,365,249 B1 | 4/2002 | Al Ghatta | |
| 6,403,663 B1 | 6/2002 | DeSimone | |
| D476,861 S | 7/2003 | Zettle | |
| 6,656,671 B1 | 12/2003 | Aylward | |
| 6,773,791 B1 | 8/2004 | Ruggie et al. | |
| 6,884,377 B1 | 4/2005 | Bernham | |
| 6,884,823 B1 | 4/2005 | Pierick | |
| 6,948,378 B2 | 9/2005 | Solberg | |
| 6,979,494 B2 | 12/2005 | Berrier et al. | |
| 7,041,187 B2 | 5/2006 | Park et al. | |
| 7,083,849 B1 | 8/2006 | Albrecht | |
| 7,364,659 B2 | 4/2008 | Jang | |
| 8,076,616 B2 | 12/2011 | Stanger | |
| 2001/0020513 A1 | 9/2001 | Tupil | |
| 2001/0032903 A1 | 10/2001 | Durrance | |
| 2002/0168509 A1 | 11/2002 | Desimone | |
| 2003/0130364 A1 | 7/2003 | Vo | |
| 2003/0138570 A1 | 7/2003 | Kaylor et al. | |
| 2004/0005449 A1 | 1/2004 | Sugimoto | |
| 2004/0250628 A1 | 12/2004 | Solberg | |
| 2005/0035495 A1 | 2/2005 | Baker | |
| 2005/0058824 A1 | 3/2005 | Fujimoto | |
| 2005/0115975 A1 | 6/2005 | Smith | |
| 2005/0181196 A1 | 8/2005 | Aylward | |
| 2005/0203198 A1 | 9/2005 | Branch | |
| 2005/0214512 A1 | 9/2005 | Fascio | |
| 2005/0233036 A1 | 10/2005 | Feldmeier | |
| 2006/0073298 A1 | 4/2006 | Hutchinson | |
| 2006/0144915 A1 | 7/2006 | Sadlier | |
| 2007/0087089 A1 | 4/2007 | Heymann | |
| 2007/0109382 A1 | 5/2007 | LaFleche | |
| 2007/0148432 A1 | 6/2007 | Baker et al. | |
| 2007/0292807 A1 | 12/2007 | Campbell | |

(56) References Cited

U.S. PATENT DOCUMENTS

| | | |
|---|---|---|
| 2008/0087715 A1 | 4/2008 | Robertson |
| 2008/0274346 A1 | 11/2008 | Miller |
| 2008/0277817 A1 | 11/2008 | Miller |
| 2008/0280123 A1 | 11/2008 | Miller |
| 2009/0035596 A1 | 2/2009 | Higashi |
| 2009/0065136 A1 | 3/2009 | Nadella |
| 2009/0104420 A1 | 4/2009 | Nadella |
| 2009/0309250 A1 | 12/2009 | Nadella |
| 2010/0028654 A1 | 2/2010 | Takase |
| 2010/0062235 A1 | 3/2010 | Nadella et al. |
| 2010/0112301 A1 | 5/2010 | Powers |
| 2010/0163450 A1 | 7/2010 | Branch |
| 2011/0000948 A1 | 1/2011 | Fuwa |
| 2011/0081524 A1 | 4/2011 | Nadella |
| 2011/0101083 A1 | 5/2011 | Matsuzaki |
| 2011/0195165 A1 | 8/2011 | Cahill |
| 2011/0251060 A1 | 10/2011 | Harrison et al. |
| 2012/0006480 A1 | 1/2012 | Ohya |

FOREIGN PATENT DOCUMENTS

| | | |
|---|---|---|
| EP | 0371392 | 6/1990 |
| EP | 1055499 A1 | 11/2000 |
| EP | 1526093 | 4/2005 |
| GB | 2044672 A | 10/1980 |
| JP | 08-174648 | 7/1996 |
| JP | 11-080408 | 3/1999 |
| JP | 2009126079 A | 6/2009 |
| WO | WO9618486 A2 | 6/1996 |
| WO | WO9721377 A2 | 6/1997 |
| WO | WO2001005574 A2 | 1/2001 |
| WO | WO0136521 A2 | 5/2001 |
| WO | WO2004103675 A1 | 12/2004 |
| WO | WO2004103828 A2 | 12/2004 |
| WO | WO2004104072 A2 | 12/2004 |
| WO | WO2009036328 A2 | 3/2009 |
| WO | WO2010012353 A1 | 2/2010 |
| WO | WO2011133568 A1 | 10/2011 |

OTHER PUBLICATIONS

Arora et al, "Preparation and characteristization of microcellular polystyrene foams processed in supercritical carbon dioxide," Macromolecules 31, p. 4614-4620 (1998).

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical CO2", Cellular Polymers: Heriot-Watt University, Mar. 23-25, 1993, 1993: p. 25.

Seeler, "Net-shape sintered microcellular foam parts, SPE Technical Papers", vol. XLIII, 1997, pp. 2032-2036.

Young, "Polymer-Solvent Phase Separation as a Route to Low Density, Microcellular Plastic Foams", Journal of Cellular Plastics, 1987. 23(1): p. 55.

Wang et al., "A method for solvent-free fabrication of porous polymer using solid-state foaming and ultrasound and tissue engineering applications," Biomaterials 27 (2006).

Mehta et al, "Prediction of Density Variation in Thick Microcellular Sheets," UW ME Course Project Report Autumn 200.

Nadella et al, "Prediction of Density Variation in Thick Microcellular Sheets," ANTEC 2004, p. 2610-2614.

Goel et al, "Generation of Microcellular Polymers using Supercritical CO2," Polymer Engineering and Science, Jul. 1994, 34:14 p. 1148; presented at the Cellular Polymers 2nd International Conference, Edinburgh UK; Mar. 1993.

Office Action for Counterpart JP2014560035, dated Dec. 20, 2016.

* cited by examiner

EVEN ROLL         SAGGING ROLL

FIG. 2A

| Position sheet of thermoplastic material | —20 |
| Position sheet of gas-permeable material | —22 |
| Wind together the positioned sheets to form a roll of thermoplastic material interleaved with the gas-permeable material | —24 |
| Expose interleaved roll to atmosphere of pressurized gas | —26 |
| Unwind gas-infused interleaved roll | —28 |

METHOD FOR INFUSING A GAS INTO A THERMOPLASTIC MATERIAL, AND RELATED SYSTEMS

CROSS REFERENCE TO RELATED APPLICATION AND CLAIM OF PRIORITY

This application claims priority from International Application No. PCT/US2013/028282, filed 28 Feb. 2013, which application claims the benefit of U.S. Provisional Patent Applications 61/605,004 filed 29 Feb. 2012, and titled "VERTICAL ROLL INTERLEAVING, SATURATION, AND UNINTERLEAVING PROCESSING SYSTEM" and 61/752,220 filed 14 Jan. 2013, and titled "APPARATUSES AND METHODS FOR A VERTICAL ROLL UNINTERLEAVING SYSTEM", all of which are incorporated by reference.

BACKGROUND

Solid-state foaming of a thermoplastic material is a process for generating a microstructure in the material that includes many small bubbles or voids. The process includes exposing the material to an atmosphere of a gas at an elevated pressure for a period of time to infuse the gas into the material. After the material has absorbed enough gas, the material is exposed to an atmosphere having less pressure, and is heated, but not melted, to cause the gas in the material to nucleate bubbles. When the bubbles have grown to a desired size, or when a specific amount of bubbles have nucleated, the material is cooled. Because the material remains a solid (does not melt) during the whole process, the material is foamed in the solid state.

Because, it takes time for enough gas in the pressurized atmosphere to infuse the thermoplastic material, the solid-state foaming process is typically done as a batch process—that is, not as a continuous process. To maximize the amount of material that can be processed during a single batch, the thermoplastic material is formed into a sheet and wound onto a roll (10 in FIGS. 1A and 1B). To promote gas infusion into all layers of the roll 10, and thus reduce the period of time that the thermoplastic material is exposed to the gas, a sheet of a gas-permeable material is interleaved between each layer of the thermoplastic material in the roll 10. The gas-permeable material promotes gas infusion throughout the whole, rolled-up thermoplastic material by keeping each of the layers of the roll 10 separated and by allowing easy passage of the gas throughout the gas-permeable sheet's microstructure to expose all of the rolled-up thermoplastic polymer material.

Figure 1A:
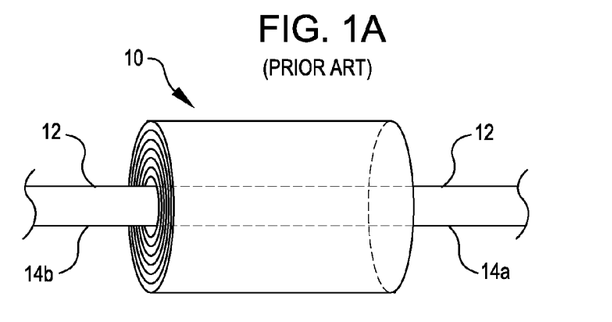
FIGS. 1A and 1B are views of a thermoplastic polymer roll interleaved with a gas-permeable material oriented in a horizontal position.

Rolls of thermoplastic material interleaved with gas-permeable material are typically large in diameter and weigh several hundred pounds. Because of their size and weight, such rolls are formed in a horizontal position as shown in FIG. 1A. In the horizontal position, one can more securely support and maneuver the roll 10 by holding onto the hub 12 because the weight of the roll 10 is supported at both ends of 14a and 14b of the hub 12.

Unfortunately, forming, processing and unwinding the roll 10 in a horizontal position can cause problems. When formed in the horizontal position, the roll 10 can become tightly wound—i.e. the individual layers of thermoplastic material and gas-permeable material that make up the roll 10 are compressed against adjacent layers. This reduces the gas permeability of the gas-permeable layers of the roll 10, and thus hinders the flow of gas throughout the gas-permeable layer during the roll's exposure to an atmosphere of pressurized gas. Consequently, some regions of the thermoplastic material do not absorb enough gas which causes an uneven distribution of bubbles in the sheet's microstructure when the sheet is subsequently foamed.

Figure 1B:
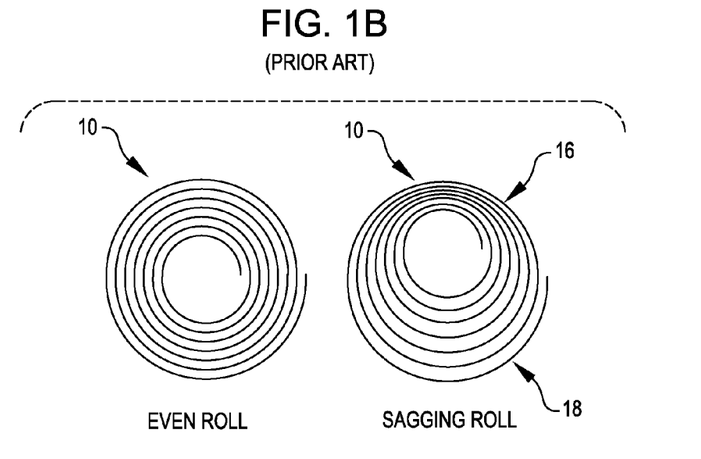

When the roll 10 is gas-infused in the horizontal position, the roll 10 can obtain an uneven distribution of gas in the material because as the thermoplastic material in the roll absorbs the gas the thermoplastic material gets heavier and sags (shown in FIG. 1B). This in turn causes the top portion 16 of the roll 10 to compress, which, as discussed above, reduces the permeability of the gas-permeable layers located in the compressed region and can cause an uneven distribution of bubbles in the sheet's microstructure when the sheet is subsequently foamed.

When the roll 10 is unwound in the horizontal position, the thermoplastic material can experience a fluctuation in tension. If the roll 10 becomes unbalanced, then as the heavier region 18 travels up during the roll's rotation, one must exert more force on the layer being pulled off the roll 10 to counter the heavier region's resistance to the roll's rotation. And, as the heavier region 18 travels down during the roll's rotation, one must exert less force on the layer being pulled off the roll 10 to counter the heavier region 18 urging the roll 10 to rotate faster. This fluctuation in the tension of the thermoplastic polymer material can cause the material to warp as the material is foamed.

SUMMARY

In an aspect of the invention, a method for infusing gas into a thermoplastic material includes positioning a sheet of a thermoplastic material into a vertical or substantially vertical position; positioning a sheet of a gas-permeable material into a vertical or substantially vertical position; and winding together the positioned sheet of thermoplastic material and the positioned sheet of gas-permeable material to form a roll of the thermoplastic material interleaved with the gas-permeable material, the interleaved roll having a longitudinal axis oriented in a vertical or substantially vertical position. The method also includes exposing the interleaved roll to an atmosphere of a gas pressurized to infuse the thermoplastic material with the gas, while the longitudinal axis of the interleaved roll is oriented in a vertical or substantially vertical position; and then unwinding the gas-infused interleaved roll, while the longitudinal axis of the interleaved roll remains in a vertical or substantially vertical position.

By winding the sheet of thermoplastic material positioned in a vertical or substantially vertical position with the sheet of gas-permeable material also positioned in a vertical or substantially vertical position to form an interleaved roll with the roll's longitudinal axis oriented in a vertical or substantially vertical position, portions of the gas-permeable sheet in the roll do not get crushed or compressed, and thus, when exposed to an atmosphere of gas remain easily permeable to the gas. Similarly, by exposing the interleaved roll to an atmosphere of a gas while the longitudinal axis of the interleaved roll is oriented in a vertical or substantially vertical position, the gas-permeable sheet in the roll does not get compressed as the weight and volume of the thermoplastic material increases, and thus, each of the thermoplastic material layers of the roll can be adequately infused with gas. And, by unwinding the gas-infused interleaved roll while the longitudinal axis of the interleaved roll remains in a vertical or substantially vertical position, unwanted fluctuations in the tension of the gas-infused thermoplastic polymer material can be mitigated.

DETAILED DESCRIPTION

Figure 2A:
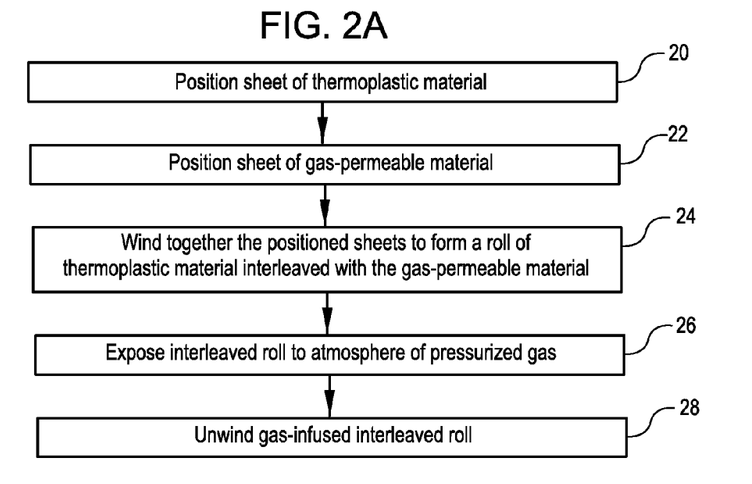
FIG. 2A is a schematic diagram of a process for infusing gas into a thermoplastic material, according to an embodiment of the invention.

FIG. 2A is a schematic diagram of a process for infusing gas into a thermoplastic material, according to an embodiment of the invention. In this embodiment the method includes positioning a sheet of a thermoplastic material into a vertical or substantially vertical position (step 20), and positioning a sheet of a gas-permeable material into a vertical or substantially vertical position (step 22). The method also includes then winding together the positioned sheet of thermoplastic material and the positioned sheet of gas-permeable material to form a roll (30 in FIG. 2B) of the thermoplastic material (32 in FIG. 2B) interleaved with the gas-permeable material (34 in FIG. 2B) (step 24), the interleaved roll 30 having a longitudinal axis (36 in FIG. 2B) oriented in a vertical or substantially vertical position. The method also includes then exposing the interleaved roll 30 to an atmosphere of a gas pressurized to infuse the thermoplastic material 32 with the gas, while the longitudinal axis 36 of the interleaved roll 30 is oriented in a vertical or substantially vertical position (step 26), and then unwinding the gas-infused interleaved roll 30, while the longitudinal axis 36 of the interleaved roll 30 remains in a vertical or substantially vertical position (step 28).

Figure 2B:
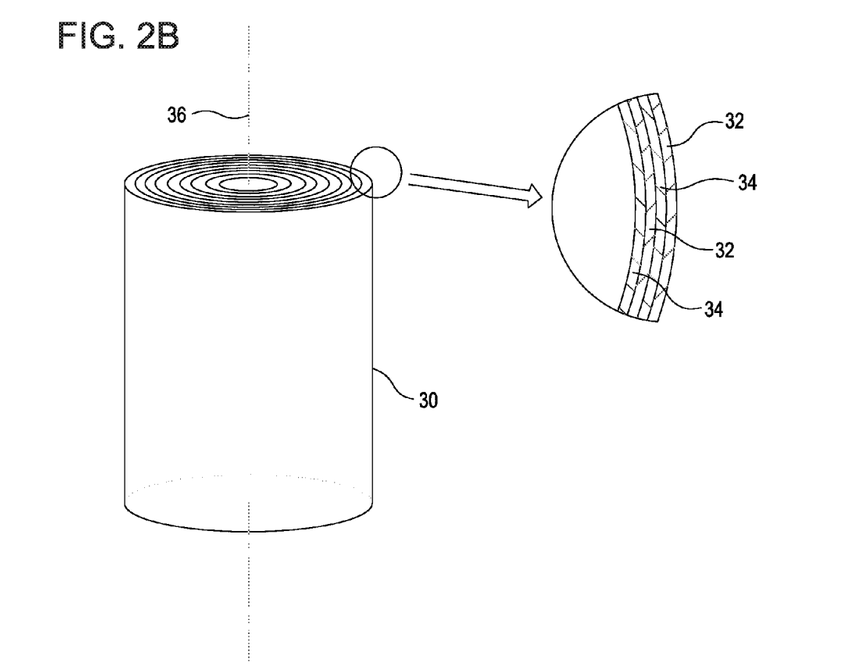
FIG. 2B is a perspective view of a roll of a thermoplastic material interleaved with a gas-permeable material oriented in a vertical position, according to an embodiment of the invention.

By winding the sheet of thermoplastic material 32 positioned in a vertical or substantially vertical position with the sheet of gas-permeable material 34 also positioned in a vertical or substantially vertical position to form an interleaved roll 30 with the roll's longitudinal axis 36 oriented in a vertical or substantially vertical position, portions of the gas-permeable sheet 34 in the roll 30 do not get crushed or compressed, and thus, when exposed to an atmosphere of gas, remain easily permeable to the gas. Similarly, by exposing the interleaved roll 30 to an atmosphere of a gas while the longitudinal axis 36 of the interleaved roll 30 is oriented in a vertical or substantially vertical position, the gas-permeable sheet 34 in the roll 30 does not get compressed as the weight and volume of the thermoplastic material 32 increases, and thus, each layer of the thermoplastic material 32 can be adequately infused with gas. In addition, by unwinding the gas-infused interleaved roll 30 while the longitudinal axis 36 of the interleaved roll 30 remains in a vertical or substantially vertical position, unwanted fluctuations in the tension of the gas-infused thermoplastic material can be mitigated.

In another embodiment, the method includes positioning a roll 30 of thermoplastic material 32 interleaved with a gas-permeable material 34 such that a longitudinal axis 36 of the roll 30 is vertical or substantially vertical, without forming the roll 30 with the roll's axis 36 in a vertical or substantially vertical position. Instead, the interleaved roll 30 may be formed with the roll's longitudinal axis 36 in a horizontal position as is conventionally done. This method also includes exposing the positioned interleaved roll 30 to an atmosphere of a gas pressurized to infuse the thermoplastic material 34 with the gas, while the longitudinal axis 36 of the interleaved roll 30 remains in a vertical or substantially vertical position, but does not include unwinding the gas-infused interleaved roll 30, while the longitudinal axis 36 of the interleaved roll 30 remains in a vertical or substantially vertical position. The roll 30 may be unwound with the roll's longitudinal axis 36 in a horizontal position as is conventionally done.

By exposing the interleaved roll 30 with the roll's longitudinal axis 36 in a vertical or substantially vertical position without forming the roll 30 or unwinding the gas-infused roll 30 with the roll's longitudinal axis 36 in a vertical or substantially vertical position, the gas-permeable sheet 34 in the roll 30 does not get compressed as the weight and volume of the thermoplastic material 32 increases. The step of exposing the roll 30 with the roll's longitudinal axis 36 in a vertical or substantially vertical position, alone, may suffice for adequately infusing each layer of the thermoplastic material 32 with gas when the roll 30 is not that large or heavy such that winding it up in a horizontal position doesn't cause a problem, or when a gas-permeable material 34 is used that can resist substantial compression without reducing the gas-permeability of the material.

Other embodiments of these methods are possible. For example, before exposing the interleaved roll 30 to the atmosphere of pressurized gas one may hold or store the interleaved roll 30 such that the longitudinal axis 36 remains in a vertical or substantially vertical position. As another example, after infusing the interleaved roll 30 with gas one may hold or store the gas-infused interleaved roll 30 such that the longitudinal axis 36 remains in a vertical or substantially vertical position. As another example, before positioning a sheet of thermoplastic material 32 in a vertical or substantially vertical position one may extrude thermoplastic material to form the sheet of the material. As another example, after unwinding the gas-infused interleaved roll 30 one may separate the gas-permeable material 34 from the sheet of thermoplastic material 32 to allow one to further process the thermoplastic material 32, such as foaming the material, and to allow one to reuse the gas-permeable material 34. As another example, one may simultaneously process multiple, interleaved rolls 30 and as the rolls 30 are sequentially unwound one may splice the ending of one of the rolls 30 with the beginning of another roll to continuously foam or otherwise process gas-infused thermoplastic material.

Still referring to FIGS. 2A and 2B, the thermoplastic material 32 may be any desired thermoplastic material. For example, in this and other embodiments, the thermoplastic material 32 includes polyethylene terephthalate (PET). In other embodiments, the thermoplastic material may include one or more of the following: polystyrene, polycarbonate, acrylonitrile-butadiene-styrene, glycol modified PET, polyethylene, polypropylene, NORYL (a blend of polyphenylene oxide and polystyrene), polyvinyl chloride, and crystallizable polyethylene terephthalate (CPET).

The gas-permeable material 34 may be any desired material capable of allowing gas to easily flow through its microstructure. For example, in this and other embodiments, the gas-permeable material 34 includes conventional cellulose. In other embodiments, the gas-permeable material may include a plastic having an open-cell microstructure, a nonwoven synthetic material and/or a high-loft textile.

Still referring to FIGS. 2A and 2B, the interleaved roll 30 may be exposed to an atmosphere of any desired gas, having any desired pressure and for any desired period of time. For example, in this and other embodiments the gas includes carbon dioxide ($CO_2$), the atmosphere is pressurized to between 400 psi and 1,000 psi, and the roll 30 remains in the pressurized atmosphere for a period of time between 6 and 100 hours. In other embodiments, the gas may include nitrogen.

Figure 3:
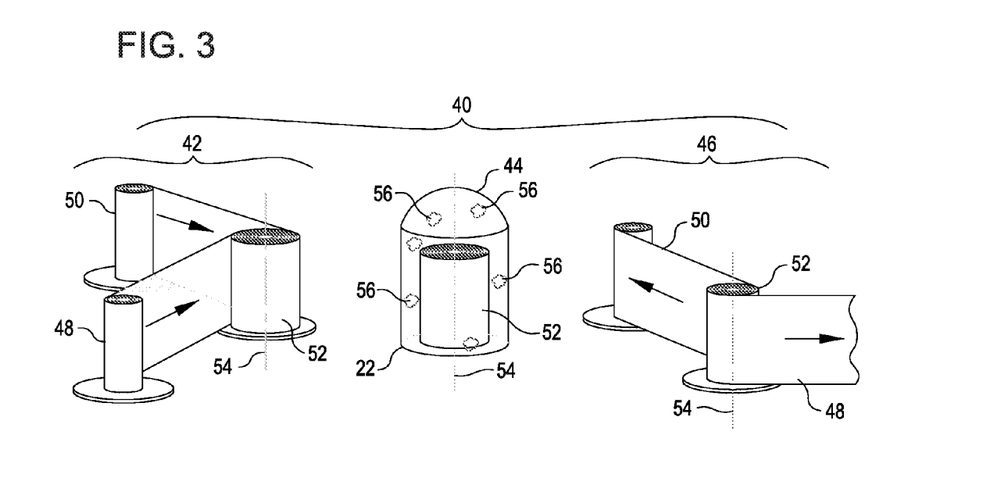
FIG. 3 is schematic view of a system for infusing gas into a thermoplastic material, according to an embodiment of the invention.

FIG. 3 is schematic view of a system 40 for infusing gas into a thermoplastic material, according to an embodiment of the invention. In this embodiment, the system 40 includes an interleaver 42, a vessel 44, and an un-interleaver 46. The interleaver 42 winds together a sheet of thermoplastic material 48 and a sheet of a gas-permeable material 50 to form a roll 52 of the thermoplastic material 48 interleaved with the gas-permeable material 50, the interleaved roll 52 having a longitudinal axis 54 that the interleaver 42 maintains in a vertical or substantially vertical position as the interleaved roll 52 is formed. The vessel 44 holds the interleaved roll 52 in a position such that the roll's longitudinal axis 54 is vertical or substantially vertical, and the atmosphere of a gas 56 pressurized to infuse the thermoplastic material 50 with the gas. The un-interleaver 46 unwinds the gas-infused, interleaved roll 52 while the longitudinal axis 54 of the roll 52 remains in a vertical or substantially vertical position. With the gas-infused, thermoplastic material 48 separated from the gas-permeable material 50, the material 48 may be further processed, such as foamed to generate a sheet of the thermoplastic material 48 that has a microstructure that includes many bubbles.

Other embodiments are possible. For example, the system 40 may include a splicer that allows one to couple the end of a gas-infused, thermoplastic material sheet 48 unwound from a first roll 52 to the beginning of another sheet of gas-infused thermoplastic material 48 that is about to be unwound from the roll 52. This may be desirable to allow one to continuously process a sheet of thermoplastic material that is gas-infused in two, separate rolls 52. As another example, the system 40 may include an extruder that forms a sheet of thermoplastic material 48 from material in pellet form. In such an embodiment, the sheet is typically extruded in a horizontal orientation, and should then be clocked to a vertical position (shown in the interleaver 42) before the interleaver 42 winds the sheet 48 with a gas-permeable sheet 50 to form the interleaved roll 52.

Figure 4:
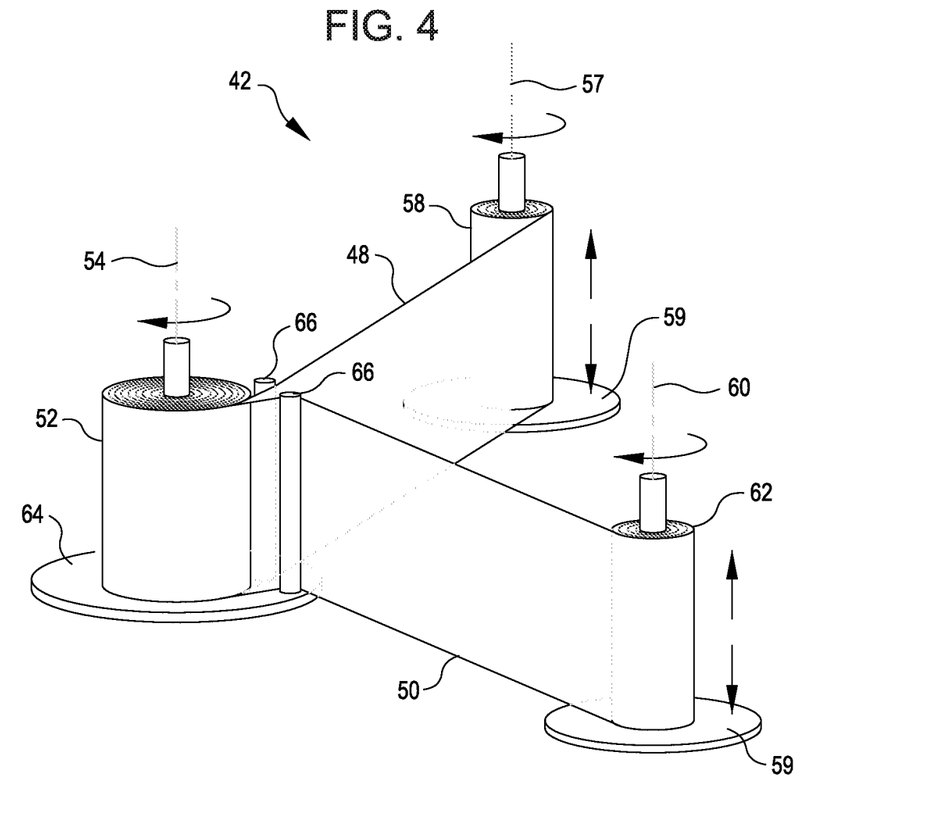
FIG. 4 is a schematic view of an interleaver of the system in FIG. 3, according to an embodiment of the invention.

FIG. 4 is a schematic view of an interleaver 42 of the system 40 in FIG. 3, according to an embodiment of the invention. The interleaver 42 winds a sheet of thermoplastic material 48 with a sheet of gas-permeable material 50 to form a roll 52 of the thermoplastic material 48 interleaved with the gas-permeable material 50.

For example, in this and other embodiments, the interleaver 42 includes a first rotatable platform 55 that is rotatable about a central axis 57 to unwind a roll 58 of thermoplastic material 24 oriented in a vertical position. The interleaver 42 also includes a second rotatable platform 59 that is rotatable about a central axis 60 to unwind a roll 62 of gas-permeable material 50 also oriented in a vertical position. The interleaver 42 also includes a rotatable platform 64 that is rotatable about the interleaved roll's longitudinal axis 54 to wind together the sheet of thermoplastic material 48 with the sheet of gas-permeable material 50 to form the interleaved roll 52. In addition, the rotatable platforms 55 and 59 are movable in an up-and-down direction to facilitate even-edge-alignment, and the rotational speed of each of the rotatable platforms 55, 59 and 64 may be modified as desired to wind the thermoplastic material 48 and the gas-permeable material 50 together under zero or near zero tension. This may be desirable to form a roll 52 that is loosely interleaved. The interleaver 42 may also include a pair of nip rollers 66 for guiding and converging the thermoplastic material 48 and the gas-permeable material 50 together.

Figure 5:
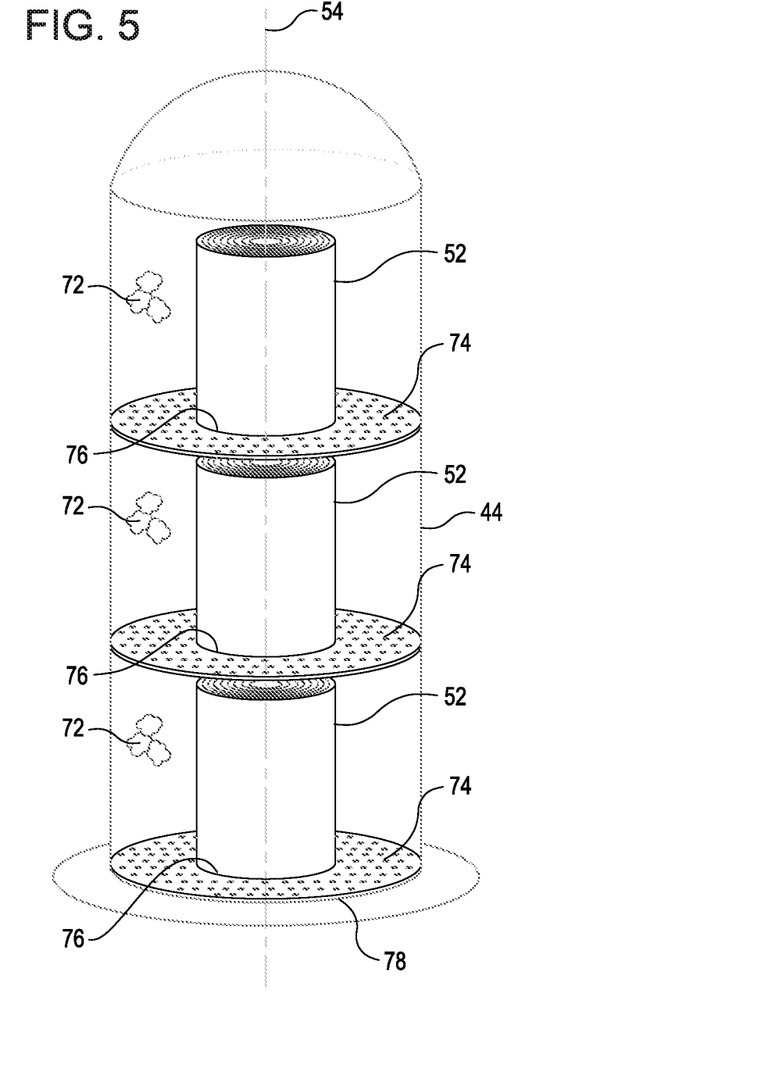
FIG. 5 is a perspective view of a pressure vessel of the system in FIG. 3, according to an embodiment of the invention.

FIG. 5 is a perspective view of a vessel 44 of the system 40 in FIG. 3, according to an embodiment of the invention. In this and other embodiments, the vessel 44 is configured to hold three interleaved rolls 52 in a vertical alignment, but may be configured to hold more or less than three rolls 52, and in other positions that do not cause the rolls 52 to be vertically aligned with each other. In addition, the vessel 44 is configured to hold an atmosphere of gas at significantly elevated pressures and for significantly long periods of time. To promote quicker and more consistent infusion of the gas 72 into each roll 52, the vessel 44 includes a grate 74 that supports each roll 52 inside the vessel 44. Each grate 74 is porous to allow gas 72 to enter each, respective roll 52 from the roll's bottom 76, yet strong enough to prevent each, respective roll 52 from falling toward the bottom 78 of the vessel 44.

Figure 6:
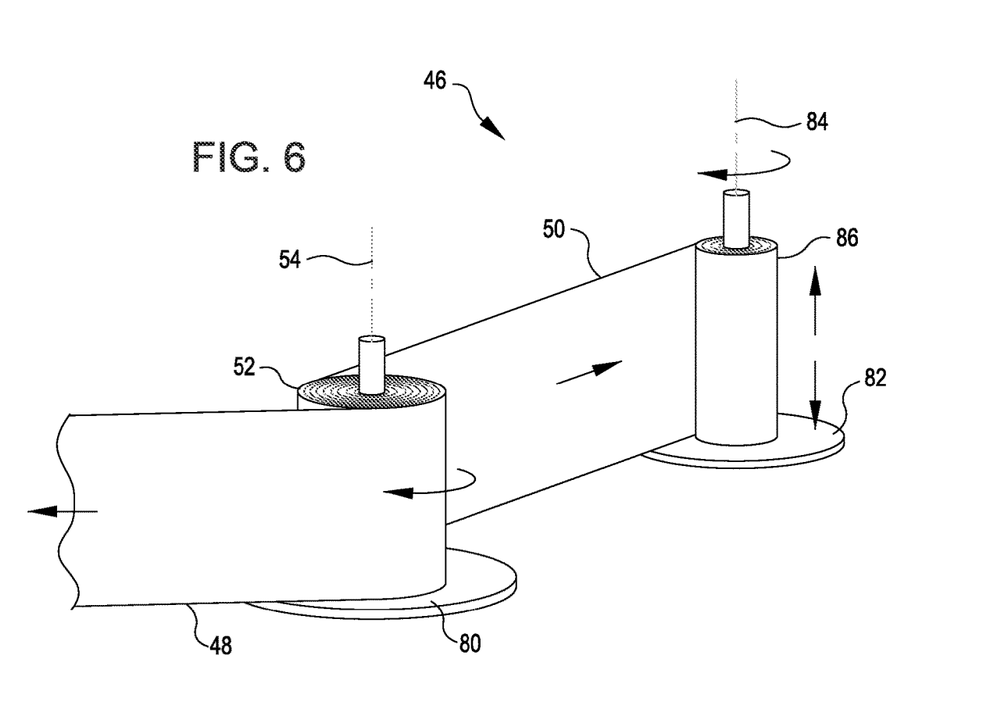
FIG. 6 is a schematic view of an un-interleaver of the system in FIG. 3, according to an embodiment of the invention.

FIG. 6 is a schematic view of an un-interleaver 46 of the system 40 in FIG. 3, according to an embodiment of the invention. The un-interleaver 46 unwinds the gas-infused, interleaved roll 52 while the longitudinal axis 54 of the roll 52 remains in a vertical or substantially vertical position.

For example, in this and other embodiments, the un-interleaver 46 includes a rotatable platform 80 that is rotatable about the longitudinal axis 54 to unwind the roll 52 and separate the gas-infused, thermoplastic material 48 from the gas-permeable material 50. After separating the two materials 48 and 50, the gas-infused thermoplastic material 48 may be further processed. For example, the gas-infused material 48 may be directed to an oven in which the material 48 is foamed to generate a sheet of the material 48 that has a microstructure having many bubbles. The un-interleaver 46 also includes a rotatable platform 82 that is rotatable about an axis 84 to wind the gas-permeable material 50 into a roll 86 for reuse. In addition, the rotatable platform 82 is movable in an up-and-down direction to facilitate even-edge-alignment, and the rotational speed of each of the rotatable platforms 80 and 82 may be automatically adjusted to provide the sheet of thermoplastic material 48 a constant speed as it travels from the roll 54.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for infusing gas into a thermoplastic material, the method comprising:
positioning a roll of thermoplastic material interleaved with a gas-permeable material such that a longitudinal axis of the roll is vertical or substantially vertical; and
exposing the positioned interleaved roll to an atmosphere of a gas pressurized to infuse the thermoplastic material with the gas, while the longitudinal axis of the interleaved roll remains in a vertical or substantially vertical position;
wherein positioning the interleaved toll includes placing the interleaved roll on a grate to allow gas in the atmosphere to enter the roll through a bottom of the roll.

2. The method of claim 1 wherein positioning the interleaved roll includes keeping the longitudinal axis of the roll vertical or substantially vertical while the roll is inserted into a pressure vessel.

3. The method of claim 1 wherein positioning the interleaved roll includes storing the interleaved roll, before exposing the roll to the atmosphere of gas, such that the roll's longitudinal axis is vertical or substantially vertical.

4. The method of claim 1 wherein exposing the interleaved roll includes exposing the roll for a period of time between 6 and 100 hours.

5. The method of claim 1 wherein exposing the interleaved roll includes exposing the roll to an atmosphere of gas pressurized to between 400 psi and 1,000 psi.

6. The method of claim 1 wherein the atmosphere of gas includes at least one of the following: CO2 and Nitrogen.

7. The method of claim 1 wherein exposing the interleaved roll includes inserting the roll into a pressure vessel.

8. A method for infusing gas into a thermoplastic material, the method comprising:
positioning a sheet of the thermoplastic material into a vertical or substantially vertical position;
positioning a sheet of a gas-permeable material into a vertical or substantially vertical position;
winding together the positioned sheet of thermoplastic material and the positioned sheet of gas-permeable material to form a roll of the thermoplastic material interleaved with the gas-permeable material, the interleaved roll having a longitudinal axis oriented in a vertical or substantially vertical position;
exposing the interleaved roll to an atmosphere of the gas pressurized to infuse the thermoplastic material with the gas, while the longitudinal axis of the interleaved roll is oriented in the vertical or substantially vertical position; and
unwinding the gas-infused interleaved roll, while the longitudinal axis of the interleaved roll remains in the vertical or substantially vertical position.

9. The method of claim 8 wherein the sheet of thermoplastic material includes at least one of the following: polyethylene terephthalate (PET), polystyrene, polycarbonate, acrylonitrile-butadiene-styrene, glycol modified PET, polyethylene, polypropylene, NORYL (a blend of polyphenylene oxide and polystyrene), polyvinyl chloride, and crystallizable PET (CPET).

10. The method of claim 8 wherein the sheet of gas-permeable material includes at least one of the following: cellulose, non-woven synthetics, and high-loft textiles.

11. The method of claim 8 further comprising holding the interleaved roll of thermoplastic material such that the longitudinal axis remains in the vertical or substantially vertical position, before exposing the interleaved roll to the atmosphere of pressurized gas.

12. The method of claim 8 further comprising holding the gas-infused interleaved roll of thermoplastic material such that the longitudinal axis remains in the vertical or substantially vertical position, after infusing the interleaved roll with gas.

13. The method of claim 8 further comprising extruding thermoplastic material to form the sheet of the thermoplastic material before positioning the sheet in the vertical or substantially vertical position.

14. The method of claim 8 further comprising separating the gas-permeable material from the sheet of thermoplastic material holding the gas, after unwinding the gas-infused interleaved roll.

15. A system to infuse gas into a thermoplastic material, the system comprising:
an interleaver operable to wind together a sheet of thermoplastic material and a sheet of a gas-permeable material to form a roll of the thermoplastic material interleaved with the gas-permeable material, the interleaved roll having a longitudinal axis that the interleaver maintains in a vertical or substantially vertical position as the interleaved roll is formed;
a vessel operable to hold:
the interleaved roll in a position such that the roll's longitudinal axis is vertical or substantially vertical; and
an atmosphere of the gas pressurized to infuse the thermoplastic material with the gas; and
an un-interleaver operable to unwind the interleaved roll while the longitudinal axis of the roll remains in the vertical or substantially vertical position.

16. The system of claim 15 wherein the un-interleaver is operable to separate the gas-permeable material from the sheet of thermoplastic material infused with the gas.

17. The system of claim 15 further comprising an extruder operable to form the sheet of thermoplastic material.

* * * * *